US009194269B2

United States Patent
Axe et al.

(10) Patent No.: US 9,194,269 B2
(45) Date of Patent: Nov. 24, 2015

(54) REDUCTANT INJECTOR TEMPERATURE MODEL BASED ON COIL RESISTANCE

(71) Applicants: Bryan D Axe, Redford, MI (US); Louai A Faied, Rochester Hills, MI (US)

(72) Inventors: Bryan D Axe, Redford, MI (US); Louai A Faied, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 54 days.

(21) Appl. No.: 14/260,327

(22) Filed: Apr. 24, 2014

(65) Prior Publication Data

US 2015/0308314 A1 Oct. 29, 2015

(51) Int. Cl.
- F01N 3/18 (2006.01)
- G05D 23/19 (2006.01)
- G05D 23/30 (2006.01)
- F01N 3/20 (2006.01)

(52) U.S. Cl.
CPC ..................... *F01N 3/208* (2013.01)

(58) Field of Classification Search
CPC ........... F01N 3/18; F01N 3/208; G05D 23/19; G05D 23/30
See application file for complete search history.

(56) References Cited

U.S. PATENT DOCUMENTS

| 8,266,894 B2 * | 9/2012 | Perrin et al. ................... 60/286 |
| 2004/0159167 A1 * | 8/2004 | Bremer et al. ............. 73/864.85 |
| 2011/0071771 A1 | 3/2011 | Viale et al. |
| 2012/0017571 A1 | 1/2012 | Von Meduna et al. |
| 2012/0255282 A1 | 10/2012 | Nagata |
| 2013/0152556 A1 | 6/2013 | Cox et al. |
| 2014/0197854 A1 * | 7/2014 | Czimmek ...................... 324/713 |
| 2015/0034167 A1 * | 2/2015 | David et al. ........................ 137/3 |

FOREIGN PATENT DOCUMENTS

| DE | 10149982 A1 | 4/2003 |
| DE | 102007017458 A1 | 10/2008 |
| DE | 102010034709 A1 | 2/2012 |
| DE | 102013212139 B3 | 1/2014 |

OTHER PUBLICATIONS

International Search Report and Written Opinion dated Jun. 22, 2015 for International Application No. PCT/US2015/026982, International Filing Date Apr. 22, 2015.

* cited by examiner

*Primary Examiner* — Timothy Vanoy
(74) *Attorney, Agent, or Firm* — Ralph E. Smith

(57) ABSTRACT

A method includes receiving, at a controller having one or more processors, one or more measured parameters, each measured parameter related to a temperature that affects a temperature of a reductant injector of an exhaust system of an engine. The method includes determining a resistance of a coil of the reductant injector. The method includes estimating the temperature of the reductant injector based on (i) the one or more measured parameters and (ii) the coil resistance. The method also includes controlling a duty cycle of the reductant injector based on the estimated temperature of the reductant injector.

16 Claims, 4 Drawing Sheets

REDUCTANT INJECTOR TEMPERATURE MODEL BASED ON COIL RESISTANCE

FIELD

The present disclosure relates generally to selective catalytic reduction (SCR) systems and, more particularly, to systems and methods utilizing a reductant injector temperature model based on coil resistance.

BACKGROUND

An engine combusts a mixture of air and fuel within cylinders to drive pistons that rotatably turn a crankshaft to generate drive torque. Exhaust gas resulting from combustion is expelled from the cylinders into an exhaust system. The exhaust system includes exhaust treatment components to decrease emissions. One example exhaust treatment component for engines is a selective catalytic reduction (SCR) system. SCR systems inject a reductant, e.g., urea solution, into the exhaust system upstream from an SCR catalyst. The mixture of the reductant and the exhaust gas reacts with the SCR catalyst, thereby decreasing emissions, such as nitrogen oxides (NOx). The temperature of the reductant injector varies during operation, which affects the durability of the reductant injector and/or the spray quality of the reductant injected by the reductant injector if not accounted for. Moreover, at high temperatures, the reductant injector could inject an incorrect amount of reductant into the exhaust system. Conventional temperature models do not accurately model the temperature of the reductant injector. Thus, while these systems work for their intended purpose, there remains a need for improvement in the relevant art.

SUMMARY

In one aspect, a method is provided in accordance with the teachings of the present disclosure. In an exemplary implementation, the method includes receiving, at a controller of an engine, the controller having one or more processors, one or more measured parameters, each measured parameter related to a temperature that affects a temperature of a reductant injector of an exhaust system of the engine. The method includes calculating, at the controller, a temperature of a coil of a reductant injector based on a resistance of the coil. The method includes estimating, at the controller, the temperature of the reductant injector based on (i) the one or more measured parameters and (ii) the coil resistance. The method includes controlling, by the controller, a duty cycle of the reductant injector based on the estimated temperature of the reductant injector.

In some implementations, the reductant injector is an air-cooled, solenoid-type reductant injector, and the estimated temperature of the reductant injector is an estimated temperature of a reductant within the reductant injector.

In some implementations, the controller is configured to control the duty cycle of the reductant injector based on the estimated temperature of the reductant injector to (i) actively cool the reductant injector or (ii) prevent temperature overshoots of the reductant injector.

In some implementations, the one or more measured parameters comprise: (i) a temperature of a reductant tank of the exhaust system, (ii) a temperature of the exhaust gas in the exhaust system, (iii) an ambient temperature, and (iv) a speed of a vehicle powered by the engine.

In some implementations, the controller is configured to estimate the temperature of the reductant injector based on a coil temperature component, an ambient temperature component, a reductant flow temperature component, and an exhaust temperature component.

In some implementations, the coil temperature component is based on the coil resistance and the ambient temperature, the ambient temperature component is based on the vehicle speed, the ambient temperature, the coil temperature component, and the exhaust temperature component, the reductant fluid component is based on a reductant injection rate of the reductant injector, the reductant tank temperature, the coil temperature component, and the exhaust temperature component, and the exhaust temperature component is based on the exhaust gas temperature, an exhaust gas flow rate, and the coil temperature component.

In some implementations, estimating the temperature of the reductant injector further comprises summing the coil temperature component, the ambient temperature component, the reductant flow temperature component, and the exhaust temperature component.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As mentioned above, there remains a need for improvement in the art of selective catalytic reduction (SCR) systems, particularly for SCR systems that utilize solenoid-type air-cooled reductant injectors. An air-cooled reductant injector requires both heating and cooling depending on its operating temperature. If the temperature of the reductant injector is not accurately monitored and controlled, the durability of the reductant injector is not maintained and/or the spray quality of the reductant injected by the reductant injector does not satisfy system requirements. When the durability of the reductant injector is not maintained, warranty costs could increase. When the spray quality of the reductant injected by the reductant injector does not meet system requirements, deposits could accumulate in the exhaust system, which could restrict exhaust gas flow thereby decreasing exhaust system and/or engine/vehicle performance. Moreover, at high temperatures, the reductant injector could inject an incorrect amount of reductant. When insufficient reductant is injected, SCR system performance decreases, which could increase emissions. Alternatively, when excess reductant is injected, the reductant tank could be depleted faster than expected, e.g., reductant tanks are typically refilled during each vehicle oil change.

Accordingly, systems and methods are presented that utilize a reductant injector temperature model based on coil resistance. By utilizing the reductant injector temperature model, the systems and methods are able to implement an active cooling strategy for the reductant injector and prevent temperature overshoots without any additional hardware components. The reductant injector temperature model accounts for various sources of heat transfer (convection) through the exhaust system, as well as a temperature of a solenoid (coil) of the reductant injector, to accurately estimate the reductant injector temperature. This estimated temperature is then used to control a duty cycle of the reductant injector to actively cool the reductant injector and/or prevent temperature overshoots of the reductant injector. More specifically, the duty cycle of the reductant injector could be controlled in response to (or in brief anticipation of) heat transfers in the exhaust system that affect performance of the reductant injector.

Figure 1:
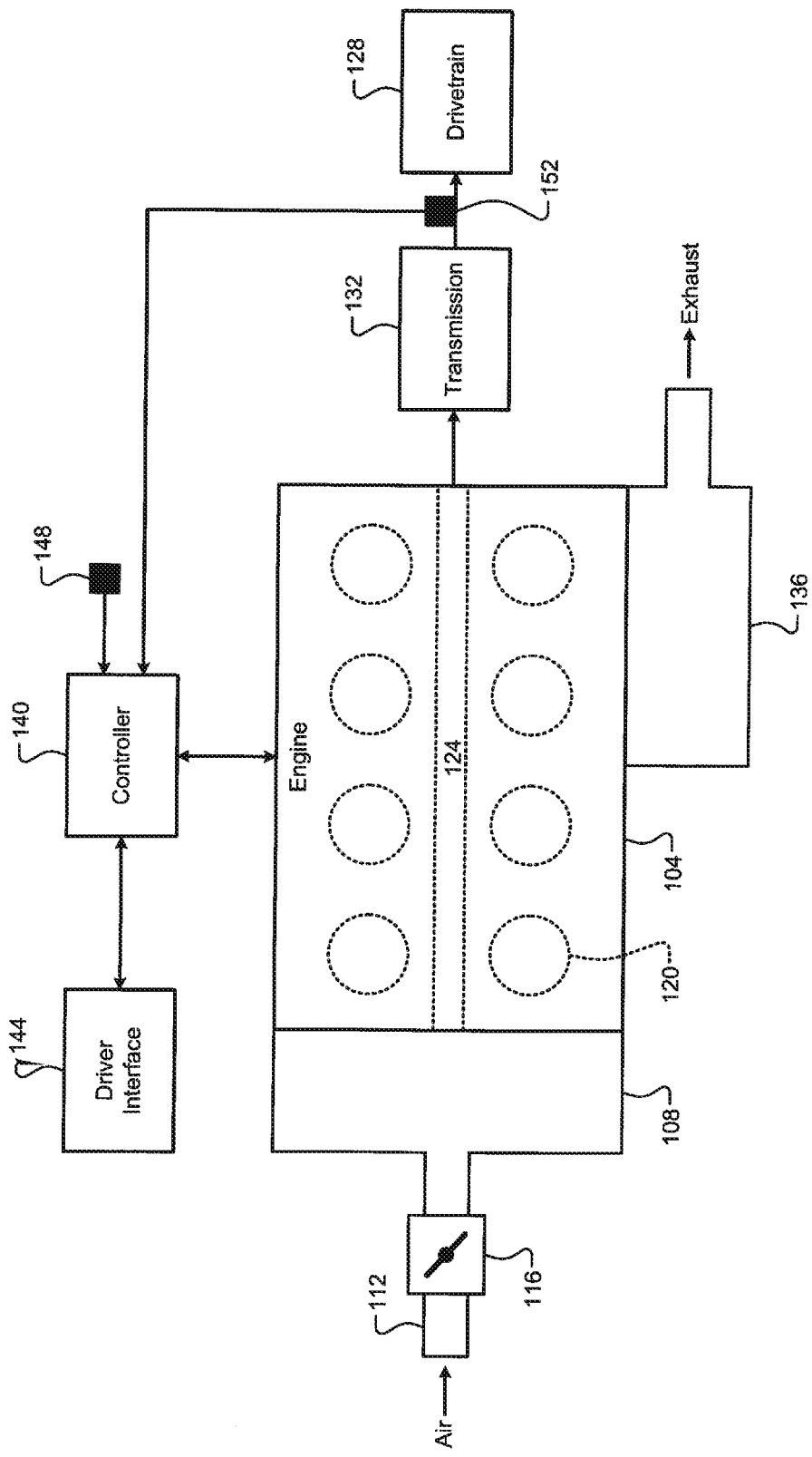
FIG. 1 is an example partial schematic diagram of an engine system according to the principles of the present disclosure.

Referring now to FIG. 1, an example partial schematic diagram of an engine system 100 is illustrated. The engine system 100 includes an engine 104. In one exemplary implementation, the engine 104 is a diesel engine, but it will be appreciated that other suitable engines could be implemented that could utilize an SCR system, e.g., a homogeneous charge compression ignition (HCCI) engine. The engine 104 draws air into an intake manifold 108 through an induction system 112 regulated by a throttle 116. The air in the intake manifold 108 is distributed to a plurality of cylinders 120 and combined with fuel to create a mixture of air and fuel. While eight cylinders 120 are shown, it will be appreciated that other numbers of cylinders could be implemented (4, 5, 6, 10, etc.).

The mixture of air and fuel is compressed by pistons (not shown) until the mixture reaches a critical pressure and/or temperature and combusts or is combusted via a spark provided by spark plugs (not shown). The combustion of the mixture of air and fuel drives the pistons, which rotatably turn a crankshaft 124 to generate drive torque. The drive torque is transferred to a drivetrain 128 (one or more wheels, a differential, etc.) by a transmission 132. Exhaust gas resulting from combustion is expelled from the cylinders 120 into an exhaust system 136. The exhaust system 136 includes exhaust treatment component(s) for treating the exhaust gas to decrease emissions before releasing the exhaust gas into the atmosphere. The exhaust system 136 and its exhaust treatment component(s) are discussed in greater detail below with reference to FIG. 2.

A controller 140, e.g., an engine control unit (ECU), controls operation of the engine system 100. The controller 140 receives input from a driver via a driver input device 144, e.g., an accelerator pedal. This driver input represents a torque request, and the controller 140 controls the throttle 116 and the injection of fuel such that the engine 104 generates/outputs an amount of torque corresponding to the torque request. The controller 140 also receives an ambient temperature from an ambient temperature sensor 148, a vehicle speed from a vehicle speed sensor 152, e.g., a transmission output shaft speed (TOSS) or anti-lock brake system (ABS) wheel speed sensor. The controller 140 also receives other temperature-related measured parameters from and controls operation of the exhaust system 136 according to the principles of the present disclosure, which are discussed in greater detail below.

Figure 2:
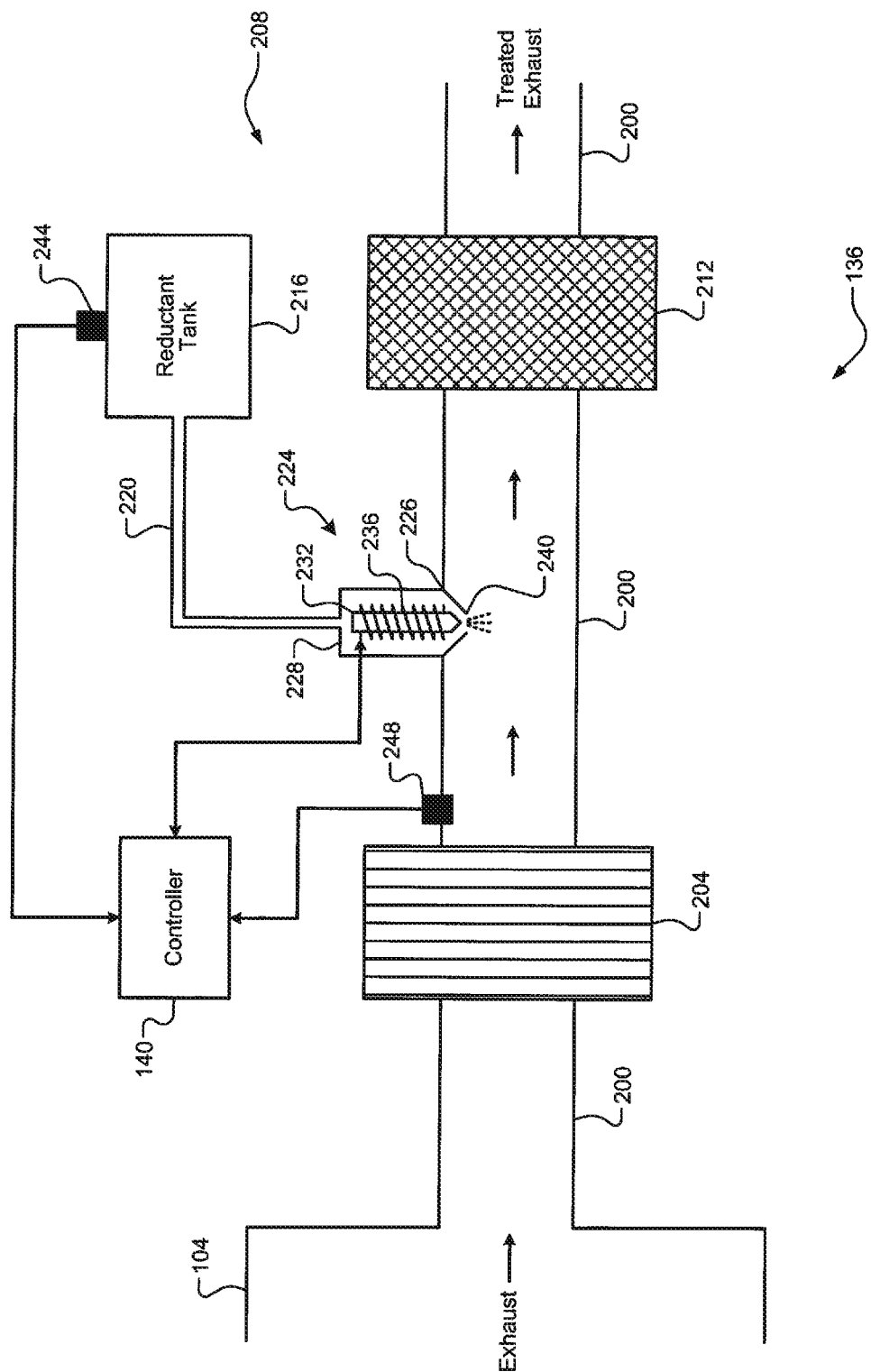
FIG. 2 is an example partial schematic diagram of an exhaust system according to the principles of the present disclosure.

Referring now to FIG. 2, an example partial schematic diagram of the exhaust system 136 is illustrated. The exhaust system 136 includes an exhaust pipe 200 through which the exhaust gas produced by the engine 104 flows before being released into the atmosphere as treated exhaust gas. The exhaust system 136 includes a particulate matter filter (PMF) 204 that removes particulate matter from the exhaust gas. An SCR system 208 is located downstream from the PMF 204. While only the PMF 204 and the SCR system 208 are illustrated, it will be appreciated that the exhaust system 136 could include other exhaust treatment components (an oxidation catalyst, a lean NOx trap, a NOx absorber, a NOx adsorber, etc.).

The SCR system 208 includes an SCR catalyst 212, a reductant tank 216, a reductant supply line 220, and a reductant injector 224. The reductant tank 216 stores reductant, e.g., urea solution. The reductant is supplied from the reductant tank 216 to the reductant injector 224 via the reductant supply line 220. In one exemplary implementation, the reductant injector 224 is a solenoid-type injector comprising a housing 228, a plunger 232, a solenoid or coil 236, and a tip 240. The reductant injector 224 could also include other suitable components, such as a magnet (not shown) coupled to a top of the plunger 232 and a spring (not shown) arranged about the plunger 232 towards the tip 240. It will be appreciated, however, that other types of solenoid-type reductant injectors could be implemented that have a same or similar configuration of the tip 240.

The exhaust gas output by the DPF 204 is combined with the reductant injected into the exhaust pipe 200 by the reductant injector 224. The mixture of the exhaust gas and the reductant reacts with the SCR catalyst 212 thereby decreasing emissions, such as NOx. In one exemplary implementation, the SCR catalyst 212 is a ceramic material wash-coated with a zeolite. The SCR catalyst 212 could have a honeycomb configuration, a plate configuration, or another suitable configuration. After the reaction, the treated exhaust gas is output from the SCR catalyst 212 and then released into the atmosphere. The reductant injector 224 could be arranged perpendicular to the exhaust pipe 200 (as shown) or at an angle relative to the exhaust pipe 200, e.g., aiming/spraying towards the SCR catalyst 212. The term "spray quality" as used herein refers to an area of injected reductant coverage by the reductant injector 224, e.g., a cone shape. Inaccurate reductant injector temperature modeling could result in decreased spray quality/coverage by causing a larger cone shape or a wider spray, which could lead to deposits and/or decreased performance.

The controller 140 controls a duty cycle of the reductant injector 224 based on various operating parameters. Specifically, the controller 140 supplies a current to the coil 236 of the reductant injector 224. In one exemplary implementation, the current is a pulse-width modulated (PWM) current. The current in the coil 236 causes the plunger 232 to retract, thereby opening the reductant injector 224 and allowing the reductant to be sprayed into the exhaust pipe 200 through the tip 240. The controller 140 receives a measured temperature of the reductant tank 216 from a reductant tank temperature sensor 244. In one exemplary implementation, the reductant tank temperature sensor 244 measures a temperature of the reductant housed by (within) the reductant tank 216. The controller 140 also receives a measured temperature of the exhaust gas (also referred to as "exhaust gas temperature" or "EGT") from an exhaust gas temperature sensor 248. While the EGT sensor 248 is arranged at an outlet of the DPF 204, it will be appreciated that the EGT sensor 248 could be arranged at any point upstream from the reductant injector 224 with respect to the exhaust pipe 200.

Figure 3:
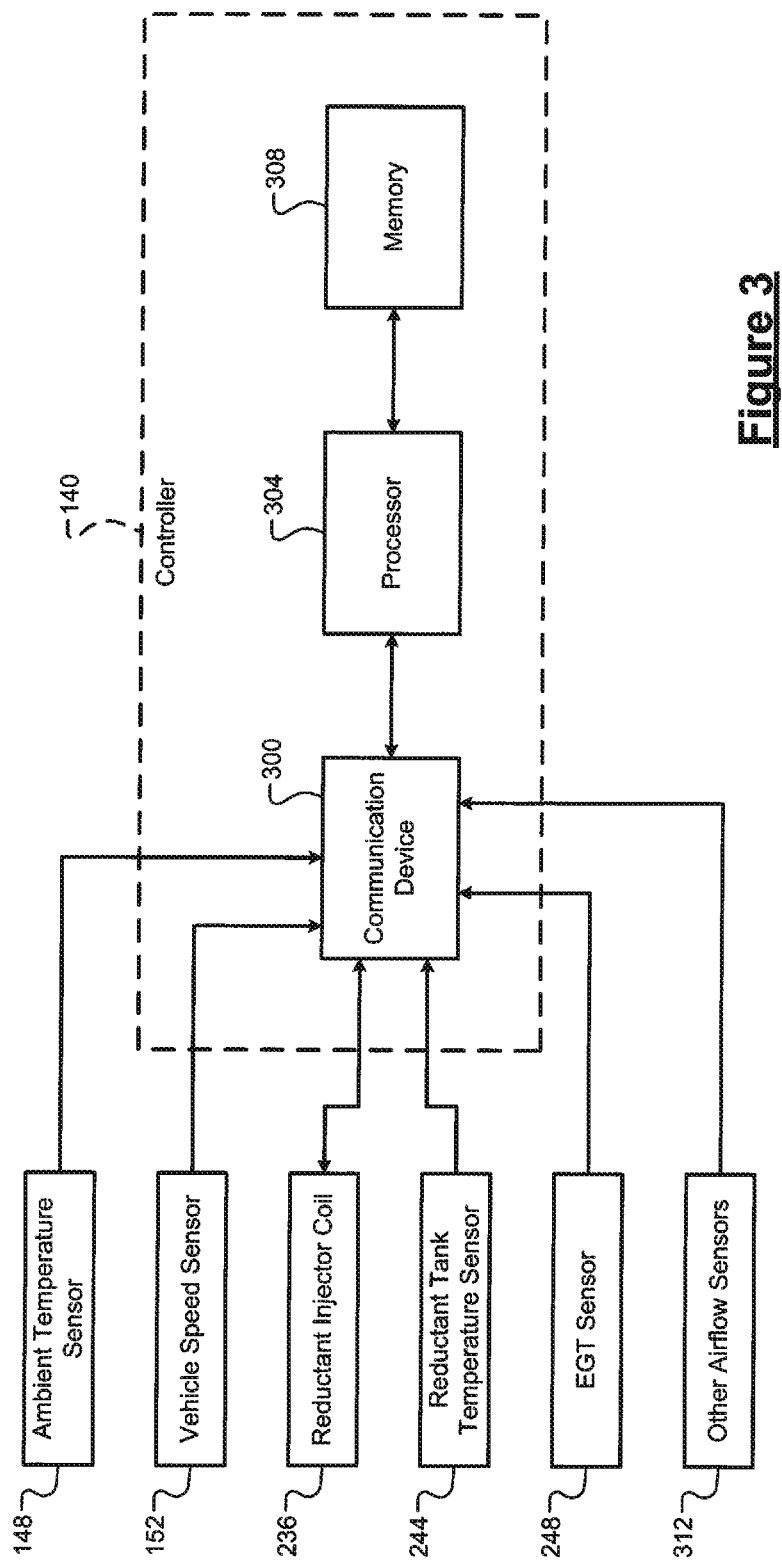
FIG. 3 is an example functional block diagram of a controller according to the principles of the present disclosure.

Referring now to FIG. 3, an example functional block diagram of the controller 140 is illustrated. The controller 140 includes a communication device 300, a processor 304, and a memory 308. The communication device 300 includes suitable components, e.g., a transceiver, configured to communicate with other components of the engine system 100 via a controller area network. The memory 308 is any suitable storage medium (flash, hard disk, etc.) configured to store information at the controller 140. In one exemplary implementation, the memory 308 stores calibrated coefficients of the reductant injector temperature model of the present disclosure, which is described in greater detail below.

The processor 304 controls operation of the controller 140, and thus controls operation of the engine system 100. Examples of functions performed by the processor 304 include loading/executing an operating system of the controller 140, controlling transmission by and processing information received via the communication device 300, and controlling read/write operations at the memory 308. It will be appreciated that the term "processor" as used herein refers to both a single processor and two or more processors operating in a parallel or distributed architecture. The processor 304 also executes the reductant injector temperature estimation and control techniques of the present disclosure, which are also described in greater detail below.

The processor 304 receives one or more measured parameters related to a temperature that affects a temperature of the reductant injector 224 of the exhaust system 136 of the engine 104. Examples of these measured parameters include ambient temperature, vehicle speed, EGT, and reductant tank temperature. The reductant tank temperature affects the temperature of the reductant supplied to the reductant injector 224, and thereby directly affects the temperature of the reductant injector 224. The remaining parameters affect the temperature of the exhaust gas either directly or indirectly, e.g., via convection, and the EGT affects the temperature of the reductant injector 224 and, in particular, the temperature of the reductant within the reductant injector 224, e.g., near its tip 240. The ambient temperature affects an overall temperature of the exhaust system 136. The vehicle speed corresponds to a vehicle underbody airflow speed, which affects convection through the exhaust system 136. The EGT directly corresponds to the temperature of the exhaust gas flowing through the exhaust system 136.

The processor 304 also calculates a flow rate of the exhaust gas through the exhaust system 136. As discussed above, the exhaust gas flow rate affects convection, which affects the temperature of the reductant injector 224. In one exemplary implementation, the processor 304 calculates the exhaust gas flow rate using an exhaust flow model. The exhaust flow model uses various engine operating parameters, e.g., fuel/combustion parameters, to estimate the exhaust gas flow rate based on intake mass air flow rate. These various engine operating parameters are received from other airflow sensors 312. Examples of these other airflow sensors 312 include a mass airflow (MAF) sensor, intake/exhaust pressure sensors, and the like. While these specific parameters are mentioned, it will be appreciated that any suitable exhaust flow model could be utilized to calculate the exhaust gas flow rate.

The processor 304 also calculates a resistance of the coil 236 of the reductant injector 224. The resistance of the coil 236 corresponds to the temperature of the coil, and the temperature of the coil 236 affects the temperature of the reductant injector 224 for the same or similar reasons as discussed above. In one exemplary implementation, the processor 304 determines the resistance of the coil 236 based on a voltage and a current at the coil 236 (V=IR). Because the processor 304 controls the current supplied to the coil 236, the processor 304 knows or has access to these values. In one exemplary implementation, the processor 304 could calculate the temperature of the coil 236 based on the resistance.

The processor 304 estimates the temperature of the reductant injector 224 based on (i) the one or more measured parameters and (ii) the coil resistance using a reductant injector temperature model. In one exemplary implementation, the processor 304 utilizes a plurality of coefficients corresponding to each of these values in order to more accurately estimate the temperature of the reductant injector 224. The coefficients provide for balancing between factors that affect the temperature of the reductant injector 224 more than others. For example, the coefficients could be based on predetermined dynamometer data, and could be stored at the memory 308. In one exemplary implementation, coil temperature and reductant fluid flow rate affect the temperature of the reductant within the reductant injector 224 more than EGT.

One exemplary implementation of the reductant injector temperature model will now be described in greater detail. The reductant injector temperature model takes into account the various temperature factors affecting the reductant injector temperature. In other words, each of these temperature factors has a corresponding temperature component.

A coil temperature component ($T_{coil}$) is calculated as follows:

$$T_{coil} = k_1 R + (k_2 T_{amb\_meas} + k_3), \quad (1)$$

where R represents the resistance of the coil 236, $T_{amb\_meas}$ represents the measured ambient temperature, and $k_1$-$k_3$ are coefficients representing (i) a slope of the resistance, (ii) an ambient temperature multiplier for an intercept of the resistance, and (iii) an offset of the resistance intercept, respectively.

An ambient temperature component ($T_{amb\_mdl}$) is calculated as follows:

$$T_{amb\_mdl} = \frac{k_4 VS + k_5 T_{amb\_meas} + k_6}{k_7}(T_{amb\_meas} - T_{coil} - T_{exh}), \quad (2)$$

where VS represents vehicle speed, $T_{exh}$ represents an exhaust temperature component (discussed in greater detail below), and $k_4$-$k_7$ are coefficients for the ambient temperature component $T_{amb\_mdl}$ representing (i) a vehicle speed multiplier, (ii) a measured ambient temperature multiplier, (iii) an offset, and (iv) an inverse scalar, respectively. A reductant flow temperature component ($T_{RF}$) is calculated as follows:

$$T_{RF} = \frac{k_9 D_{rate}^2 + k_{10} D_{rate}}{k_8}(T_{DAT\_meas} - T_{coil} - T_{exh}), \quad (3)$$

where $D_{rate}$ is the reductant (e.g., urea solution) injection rate, $T_{DAT\_meas}$ is the measured reductant tank (DAT) temperature, and $k_8$-$k_{10}$ are coefficients for the reductant flow temperature component $T_{RF}$ representing (i) an inverse scalar, (ii) a dosing rate squared multiplier, and (iii) a dosing rate multiplier, respectively.

The exhaust temperature component $T_{exh}$ is calculated as follows:

$$T_{J\_raw} = T_{amb\_meas} + [k_{16}(T_{exh\_meas} - T_{amb\_meas})] \quad (4),$$

$$T_{J,filt}(t) = \left[\frac{k_{12}-1}{k_{12}}T_{J,raw}(t-1)\right] + \left[\frac{1}{k_{12}}T_{J,raw}(t)\right], \quad (5)$$

and $$T_{exh} = \frac{k_{11}T_{j,filt} + k_{13}EF + k_{14}}{k_{15}}(T_{J,filt} - T_{coil}), \quad (6)$$

where $T_{exh\_meas}$ is the EGT, $T_{J,raw}$ represents a raw temperature at an exhaust joint or flange 226 arranged between the exhaust pipe 200 and the reductant injector 224 at a current sample n and a previous sample (n−1), $T_{J,filt}$ represents a filtered version of the raw joint temperature, EF represents the exhaust gas flow rate, and $k_{11}$-$k_{16}$ are coefficients for the exhaust temperature component $T_{exh}$ representing (i) an EGT multiplier, (ii) a time constant, (iii) an exhaust gas flow rate multiplier, (iv) an offset, (v) an exhaust joint thermal conductivity, (vi) an exhaust joint temperature factor, and (vii) an exhaust joint temperature offset, respectively.

A temperature of the reductant ($T_{fluid}$) is then estimated as follows:

$$T_{fluid} = T_{coil} + T_{amb\_mdf} + T_{RF} + T_{exh} \quad (7).$$

To provide a smoother response, a filter could be applied. In one exemplary implementation, the filter and the filtered reductant temperature ($T_{fluid\_filt}$) could be expressed as follows:

$$T_{fluid\_filt} = \left(\frac{TC-1}{TC}\right)T_{fluid}(n-1) + \left(\frac{1}{TC}\right)T_{fluid}, \quad (8)$$

where TC is a calibration time constant representing the intensity of the filter.

The filtered reductant temperature $T_{fluid\_filt}$ represents the estimated reductant injector temperature. Based on this temperature, the controller 140 controls the duty cycle of the reductant injector 224. In one exemplary implementation, the controller 140 controls a minimum reductant injection rate by the reductant injector 224 based on the estimated temperature. For example, the controller 140 could utilize a look-up table based on test data and stored at the memory 308 that relates various estimated temperatures to various minimum reductant injection rates. For temperatures not in the look-up table, linear extrapolation could be performed between neighboring values.

For example, in order to implement an active cooling strategy, the controller 140 could command the reductant injector 224 to inject at the minimum dosing rate because the minimum dosing rate represents a minimum amount of reductant required to maintain the reductant injector temperature. By injecting a minimum quantity of reductant, temperatures, e.g., the coil temperature, decrease thereby cooling the reductant injector 224. In one exemplary implementation, the controller 140 could override this minimum reductant injection due to emissions regulations and instead command a minimum acceptable reductant injection that satisfies the emissions regulations. Additionally, for example, in order to prevent temperature overshoots, the controller 140 could disable or adjust operation of the reductant injector 224 when its estimated temperature is approaching or reaches a critical temperature threshold corresponding to a temperature overshoot, e.g., a maximum acceptable operating temperature, thereby preventing potential damage to the reductant injector 224.

Figure 4:
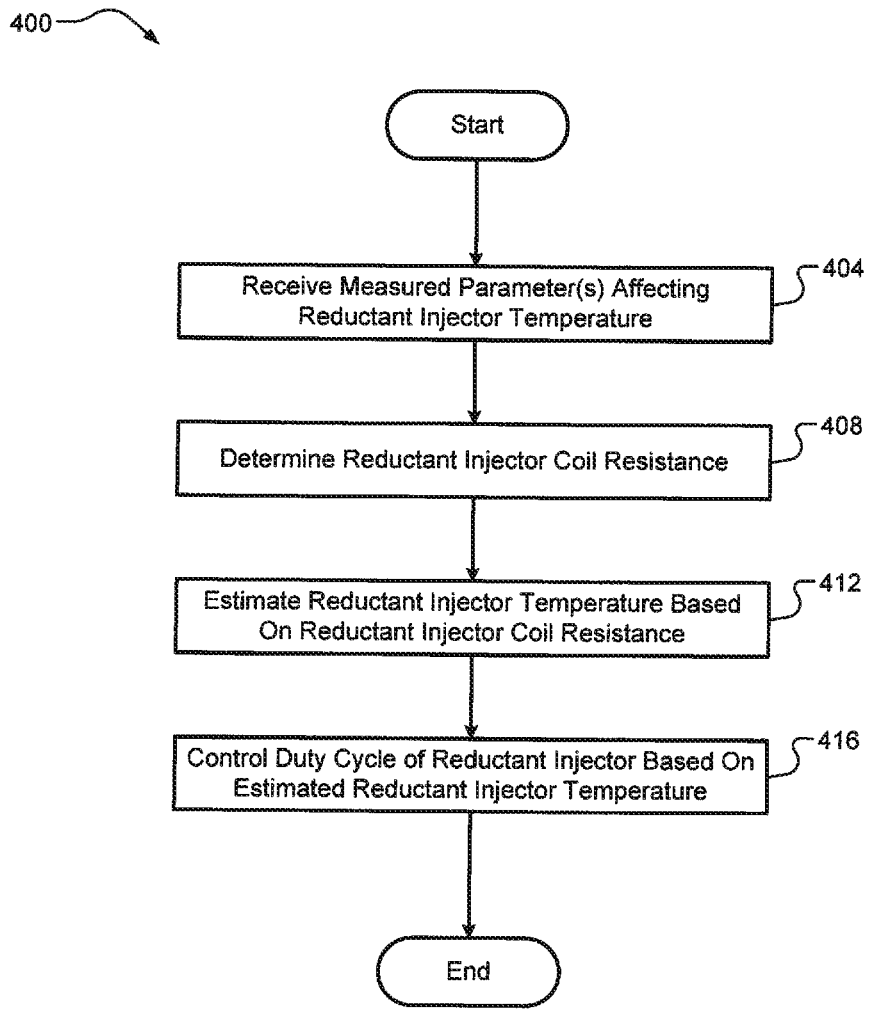
FIG. 4 is an example flow diagram of a method of controlling a selective catalytic reduction (SCR) system using a reductant injector temperature model based on coil resistance according to the principles of the present disclosure.

Referring now to FIG. 4, an example flow diagram of a method 400 for controlling the SCR system 208 using a reductant injector temperature model based on coil resistance is illustrated. At 404, the controller 140 receives one or more measured parameters, each measured parameter being related to a temperature that affects a temperature of the reductant injector 224 of the exhaust system 136 of the engine 104. Examples of the one or more measured parameters include ambient temperature, vehicle speed, EGT, and reductant tank fluid temperature.

At 408, the controller 140 determines a resistance of the coil 236. For example, the resistance of the coil 236 could be determined based on a voltage and a current at the coil 236 (e.g., V=IR). At 412, the controller 140 estimates a temperature of the reductant injector 224 based on (i) the one or more measured parameters and (ii) the coil resistance. At 416, the controller 140 controls a duty cycle of the reductant injector 224 based on the estimated temperature of the reductant injector 224. The method 400 then ends or returns to 404 for one or more additional cycles.

It should be understood that the mixing and matching of features, elements, methodologies and/or functions between various examples could be expressly contemplated herein so that one skilled in the art would appreciate from the present teachings that features, elements and/or functions of one example could be incorporated into another example as appropriate, unless described otherwise above.

What is claimed is:

1. A method, comprising:
   receiving, at a controller of an engine, the controller having one or more processors, one or more measured parameters, each measured parameter related to a temperature that affects a temperature of a reductant injector of an exhaust system of the engine;
   determining, at the controller, a resistance of a coil of the reductant injector;
   estimating, at the controller, the temperature of the reductant injector based on (i) the one or more measured parameters and (ii) the coil resistance; and
   controlling, by the controller, a duty cycle of the reductant injector based on the estimated temperature of the reductant injector.

2. The method of claim 1, wherein the reductant injector is an air-cooled, solenoid-type reductant injector, and wherein the estimated temperature of the reductant injector is an estimated temperature of a reductant inside of the reductant injector.

3. The method of claim 2, wherein the controller is configured to control the duty cycle of the reductant injector based on the estimated temperature of the reductant injector to (i) actively cool the reductant injector or (ii) prevent temperature overshoots of the reductant injector.

4. The method of claim 1, wherein the one or more measured parameters comprise:
   (i) a temperature of a reductant tank associated with the exhaust system;
   (ii) a temperature of exhaust gas in the exhaust system;
   (iii) an ambient temperature; and
   (iv) a speed of a vehicle powered by the engine.

5. The method of claim 4, wherein the controller is configured to estimate the temperature of the reductant injector based on a coil temperature component, an ambient temperature component, a reductant flow temperature component, and an exhaust temperature component.

6. The method of claim 5, wherein:
the coil temperature component is based on the coil resistance and the ambient temperature;
the ambient temperature component is based on the vehicle speed, the ambient temperature, the coil temperature component, and the exhaust gas temperature component;
the reductant flow temperature component is based on a reductant injection rate of the reductant injector, the reductant tank temperature, the coil temperature component, and the exhaust temperature component; and
the exhaust temperature component is based on the exhaust gas temperature, an exhaust gas flow rate, the ambient temperature, and the coil temperature component.

7. The method of claim 6, wherein estimating the temperature of the reductant injector further comprises summing the coil temperature component, the ambient temperature component, the reductant flow temperature component, and the exhaust temperature component.

8. The method of claim 5, wherein estimating the temperature of the reductant injector further comprises calculating, at the controller, the coil temperature component ($T_{coil}$) as:

$$T_{coil} = k_1 R + (k_2 T_{amb\_meas} + k_3),$$

where R represents the resistance of the coil, $T_{amb\_meas}$ represents the measured ambient temperature, $k_1$-$k_3$ are coefficients for the coil temperature component $T_{coil}$.

9. The method of claim 8, wherein estimating the temperature of the reductant injector further comprises calculating, at the controller, the ambient temperature component ($T_{amb\_mdl}$) as:

$$T_{amb\_mdl} = \frac{k_4 VS + k_5 T_{amb\_meas} + k_6}{k_7}(T_{amb\_meas} - T_{coil} - T_{exh}),$$

where VS represents vehicle speed and $k_4$-$k_7$ are coefficients for the ambient temperature component $T_{amb\_mdl}$.

10. The method of claim 9, wherein estimating the temperature of the reductant injector further comprises calculating, at the controller, the reductant flow temperature component ($T_{RF}$) as:

$$T_{RF} = \frac{k_9 D_{rate}^2 + k_{10} D_{rate}}{k_8}(T_{DAT\_meas} - T_{coil} - T_{exh}),$$

where $D_{rate}$ is a reductant injection rate, $T_{DAT\_meas}$ is the measured reductant tank temperature, and $k_8$-$k_{10}$ are coefficients for the reductant flow temperature component $T_{RF}$.

11. The method of claim 10, wherein estimating the temperature of the reductant injector further comprises calculating, at the controller, the exhaust gas temperature component ($T_{exh}$) as:

$$T_{J,raw} = T_{amb\_meas} + [k_{16}(T_{exh\_meas} - T_{amb\_meas})],$$

$$T_{J,filt}(t) = \left[\frac{k_{12}-1}{k_{12}} T_{J,raw}(t-1)\right] + \left[\frac{1}{k_{12}} T_{J,raw}(t)\right],$$

and $$T_{exh} = \frac{k_{11} T_{j,filt} + k_{13} EF + k_{14}}{k_{15}}(T_{J,filt} - T_{coil}),$$

where $T_{exh\_meas}$ is the exhaust gas temperature, $T_{J,raw}$ represents a raw temperature at an exhaust joint or flange associated with the reductant injector at a current sample n and a previous sample (n−1), $T_{J,filt}$ represents a filtered version of the raw joint temperature, EF represents an exhaust gas flow rate, and $k_{11}$-$k_{16}$ are coefficients for the exhaust temperature component $T_{exh}$.

12. The method of claim 11, wherein estimating the temperature of the reductant injector further comprises estimating, at the controller, the temperature of the reductant ($T_{fluid}$) as:

$$T_{fluid} = T_{coil} + T_{amb\_mdl} + T_{RF} + T_{exh}.$$

13. The method of claim 12, wherein estimating the temperature of the reductant injector further comprises filtering, at the controller, the temperature of the reductant $T_{fluid}$ to obtain the estimated temperature of the reductant injector as follows:

$$T_{fluid\_filt} = \left(\frac{TC-1}{TC}\right) T_{fluid}(n-1) + \left(\frac{1}{TC}\right) T_{fluid},$$

where $T_{fluid\_filt}$ represents the estimated temperature of the reductant injector, and where TC is a calibration time constant representing an intensity of the filtering.

14. The method of claim 4, wherein the exhaust system comprises:
an exhaust pipe through which the exhaust gas produced by the engine flows;
a particulate matter filter (PMF) configured to remove particulate matter from the exhaust gas and output filtered exhaust gas;
a selective catalytic reduction (SCR) system comprising the reductant injector, the reductant tank, and a reductant supply line arranged therebetween, and configured to treat the filtered exhaust gas and output treated exhaust gas.

15. The method of claim 14, wherein the exhaust gas temperature is measured at an outlet of the PMF.

16. The method of claim 1, wherein controlling the duty cycle of the reductant injector further comprises:
determining, at the controller, a minimum reductant injection rate for the reductant injector based on the estimated temperature of the reductant injector; and
controlling, by the controller, the duty cycle of the reductant injector based on the minimum reductant injection rate.

* * * * *